United States Patent
Lee

(10) Patent No.: US 6,791,654 B2
(45) Date of Patent: Sep. 14, 2004

(54) SEAL PATTERN FOR LIQUID CRYSTAL DISPLAY DEVICE AND METHOD FOR MANUFACTURING LIQUID CRYSTAL DISPLAY DEVICE HAVING THE SAME

(75) Inventor: Joun-Ho Lee, Daegu (KR)

(73) Assignee: LG Philips LCD. Co., Ltd., Seoul (KR)

( * ) Notice: Subject to any disclaimer, the term of this patent is extended or adjusted under 35 U.S.C. 154(b) by 0 days.

(21) Appl. No.: 10/370,599

(22) Filed: Feb. 24, 2003

(65) Prior Publication Data

US 2003/0223029 A1 Dec. 4, 2003

(30) Foreign Application Priority Data

May 28, 2002 (KR) .............................. 10-2002-0029624

(51) Int. Cl.$^7$ ............................................ G02F 1/1339
(52) U.S. Cl. ...................................... 349/153; 349/154
(58) Field of Search ................................. 349/153, 154

(56) References Cited

U.S. PATENT DOCUMENTS 3,970,363 A * 7/1976 Geyer et al. ................. 349/154
4,106,860 A * 8/1978 Kaufmann ................... 349/154
5,751,391 A   5/1998 Yokoyama et al. .......... 349/153
6,377,327 B1 * 4/2002 De Koning .................. 349/153

FOREIGN PATENT DOCUMENTS

JP            511260 A * 1/1993   ................. 349/154

* cited by examiner

*Primary Examiner*—James A. Dudek
(74) *Attorney, Agent, or Firm*—Morgan Lewis & Bockius LLP

(57) ABSTRACT

A liquid crystal display device includes a first substrate having a plurality of thin film transistors and first electrodes connected to the thin film transistor, a second substrate having a plurality of color filters and second electrodes, and a seal pattern formed along edges of one of the first and second substrates, the seal pattern having least one injection hole having a trapezoid shape, wherein a width of the injection hole decreases from a side exterior to the first and second substrates to a side interior to the first and second substrates.

16 Claims, 9 Drawing Sheets

SEAL PATTERN FOR LIQUID CRYSTAL DISPLAY DEVICE AND METHOD FOR MANUFACTURING LIQUID CRYSTAL DISPLAY DEVICE HAVING THE SAME

The present invention claims the benefit of Korean Patent Application No. 2002-29624, filed in Korea on May 28, 2002, which is hereby incorporated by reference.

BACKGROUND OF THE INVENTION

1. Field of the Invention

The present invention relates to a liquid crystal display (LCD) device and more particularly, to a seal pattern for a liquid crystal display device and a method for manufacturing a liquid crystal display (LCD) device having an improved seal pattern.

2. Discussion of the Related Art

Liquid crystal display (LCD) devices are image display devices that make use of a property of liquid crystal molecules that align according to an applied voltage. The LCD devices are commonly used in notebook computers, desktop monitors, and digital TV due to their high resolution and ability to display colors and moving images. The LCD devices generally include an upper substrate upon which a color filter is formed, a lower substrate upon which a plurality of thin film transistors are formed, and a liquid crystal layer interposed between the upper and lower substrates. The LCD devices display images by controlling changing orientations of the liquid crystal molecules by applying voltage pulses to pixel and common electrodes.

A manufacturing process of the LCD devices includes a thin film transistor array process for forming the lower substrate, an upper substrate forming process, and a liquid crystal cell process. During the thin film transistor array process, a plurality of gate and data lines is formed on a substrate and a plurality of thin film transistors are formed at crossing portions of the gate and data lines. Then, a pixel electrode is formed in a pixel region of the lower substrate. During the upper substrate forming process, a color filter, a black matrix, and a common electrode are sequentially formed on a substrate. The liquid crystal cell process includes an alignment layer forming process, a rubbing process, a cleaning process subsequent to the rubbing process, an attachment process of the upper and lower substrates, and a liquid crystal material injection process. The aforementioned liquid crystal cell process will be described more in detail hereinafter with reference to FIG. 1.

FIG. 1 is a flow chart of a process used in manufacturing an LCD device according to the related art. In FIG. 1, a first process step (ST1) includes forming an array substrate, i.e., a lower substrate. During the first process step ST1, a plurality of thin film transistors are formed on the lower substrate and each of the thin film transistors is electrically connected to a pixel electrode.

A second process step (ST2) includes forming an alignment layer by forming a thin polymer film on a substrate. Then, subsequent steps include hardening and rubbing the thin polymer film. During the subsequent steps, the thin polymer film must be uniformly formed and the rubbing process must also be performed uniformly on the thin polymer film.

A third process step (ST3) includes forming a seal pattern. The formation of the seal pattern includes forming a cell gap to allow for injection of liquid crystal material between the substrates. In addition, the seal pattern prevents the injected liquid crystal material from leaking outside of the seal pattern. The seal pattern is commonly fabricated using screen-printing processes, thermosetting resin, and glass fiber.

A fourth process step (ST4) includes dispensing a spacer. The spacer is commonly formed on the array substrate to uniformly maintain the cell gap between the two substrates.

A fifth process step (ST5) includes aligning the upper and lower substrates to each other. Then, the upper and lower substrates are attached to each other along the seal pattern.

A sixth process step (ST6) includes cutting the attached substrates into unit cells. A single glass substrate commonly includes a plurality of smaller arrays or color filter substrates in cell areas that need to be separated. During past manufacturing processes, liquid crystal material was simultaneously injected into a plurality of liquid crystal cells of a liquid crystal display panel, and the liquid crystal display panel was cut into individual liquid crystal cells. However, as sizes of LCD devices have increased, the liquid crystal display panel has been first cut into individual liquid crystal cells and the liquid crystal material has been injected into each of the individual liquid crystal cells.

A seventh process step (ST7) includes injection of liquid crystal material into the individual liquid crystal cells.

FIG. 2A is a plan view of a seal pattern structure according to the related art. In FIG. 2A, a seal pattern 18 is formed between upper and lower substrates 20 and 10, and liquid crystal material is injected into a liquid crystal cell 1 via an injection hole 16. Then, the injection hole 16 is sealed with a sealing material 22 after the injection of the liquid crystal material.

FIG. 2B is an expanded view of area "C" in FIG. 2A and illustrates a hardening process of sealing material according to the related art. In FIG. 2B, the seal pattern 18 includes the injection hole 16 having a tapered width increasing from an exterior to an interior of the liquid crystal cell 1. If the sealing material 22 is formed in the injection hole 16 and ultraviolet light is irradiated onto the sealing material 22, a portion "A" of the sealing material 22 is not exposed to the ultraviolet light because of the tapered shape of the injection hole 16. Thus, the ultraviolet light is diffracted while passing through the injection hole 16. Accordingly, the portion "A" of the sealing material 22 does not receive adequate amounts of the ultraviolet light and fails to be properly hardened. Conversely, if the ultraviolet light is excessively irradiated in an attempt to harden the portion "A" of the sealing material, the liquid crystal material is adversely affected, thereby decreasing specific resistance of the liquid crystal material.

The effect of not adequately hardening the sealing material 22 is significant in in-plane switching (IPS) mode LCD devices, whereby application of direct current (DC) adversely affects device performance. Accordingly, inadequate hardening of the sealing material 22 decreases production yield and product integrity.

SUMMARY OF THE INVENTION

Accordingly, the present invention is directed to a seal pattern for a liquid crystal display device and method for manufacturing a liquid crystal display device having the same that substantially obviates one or more of problems due to limitations and disadvantages of the related art.

An object of the present invention is to provide a seal pattern structure for a liquid crystal display device to provide for adequate hardening of the seal pattern.

Another object of the present invention is to provide a method for manufacturing a liquid crystal display device having a seal pattern structure to provide for adequate hardening of the seal pattern.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes a first substrate having a plurality of thin film transistors and first electrodes connected to the thin film transistor, a second substrate having a plurality of color filters and second electrodes, and a seal pattern formed along edges of one of the first and second substrates, the seal pattern having at least one injection hole having a trapezoid shape, wherein a width of the injection hole decreases from a side exterior to the first and second substrates to a side interior to the first and second substrates.

In another aspect, a method for manufacturing a liquid crystal display device includes forming an alignment layer on first and second substrates, forming a seal pattern along edges of one of the first and second substrates, the seal pattern including a plurality of injection holes having a trapezoid shape, wherein a width of each of the injection holes decreases from a side adjacent to the edges of the first and second substrates to a side interior to the edges of the first and second substrates, attaching the first and second substrates together, cutting the attached first and second substrates into a unit cell, injecting liquid crystal material into the unit cell via the injection holes, sealing the injection holes of the seal pattern; and hardening the seal pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiment of the present invention, which is illustrated in the accompanying drawings.

Figure 1:
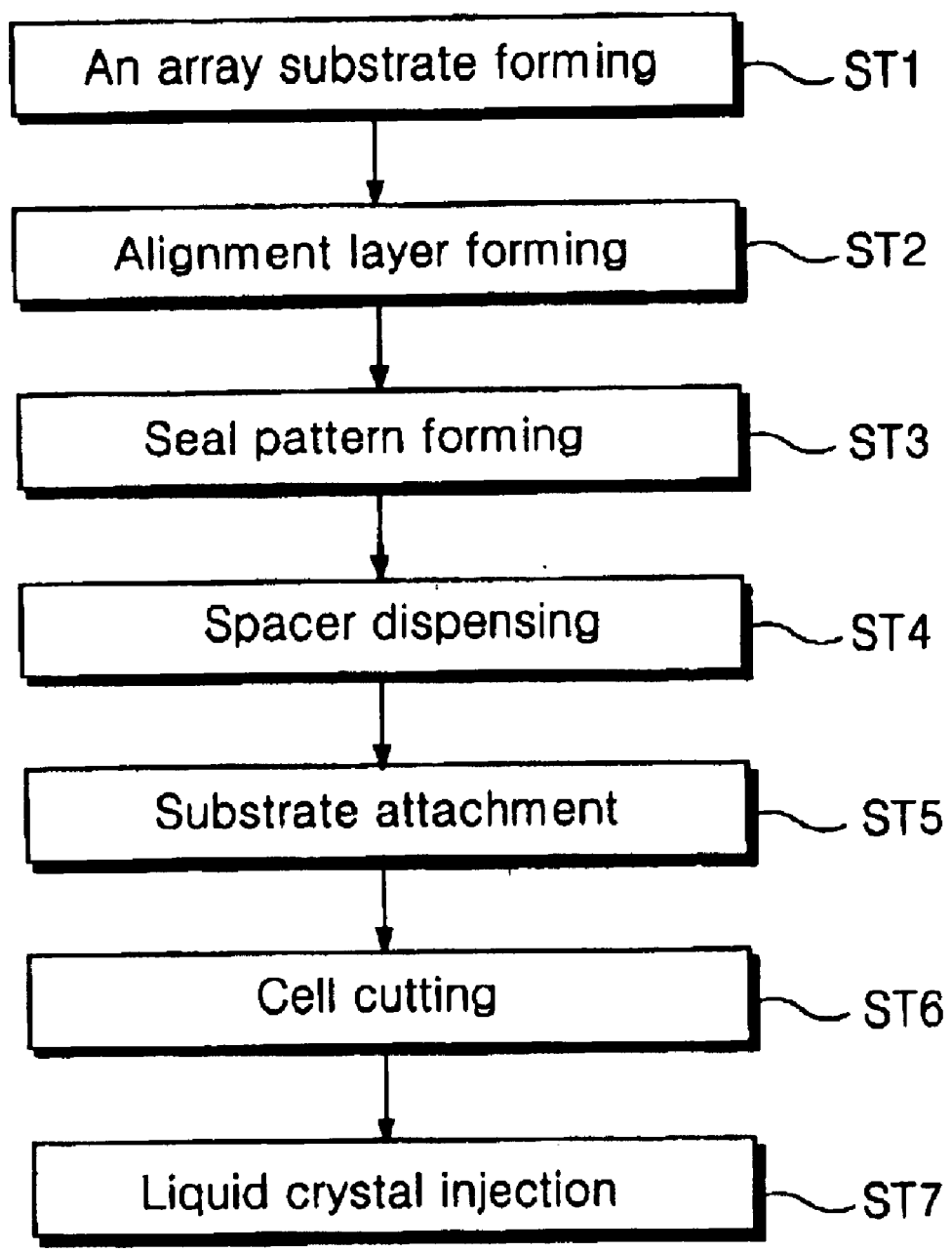
FIG. 1 is a flow chart of a process used in manufacturing an LCD device according to the related art.
Figure 2A:
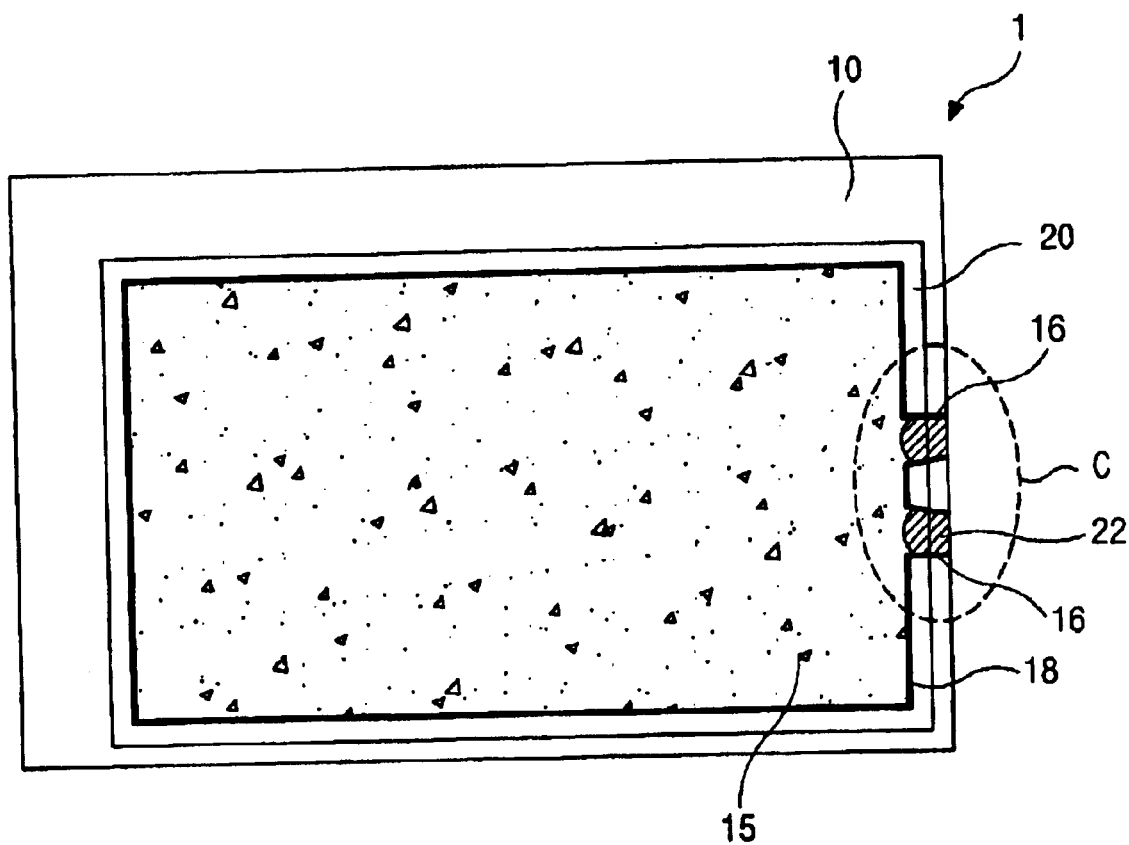
FIG. 2A is a plan view of a seal pattern structure according to the related art.
Figure 2B:
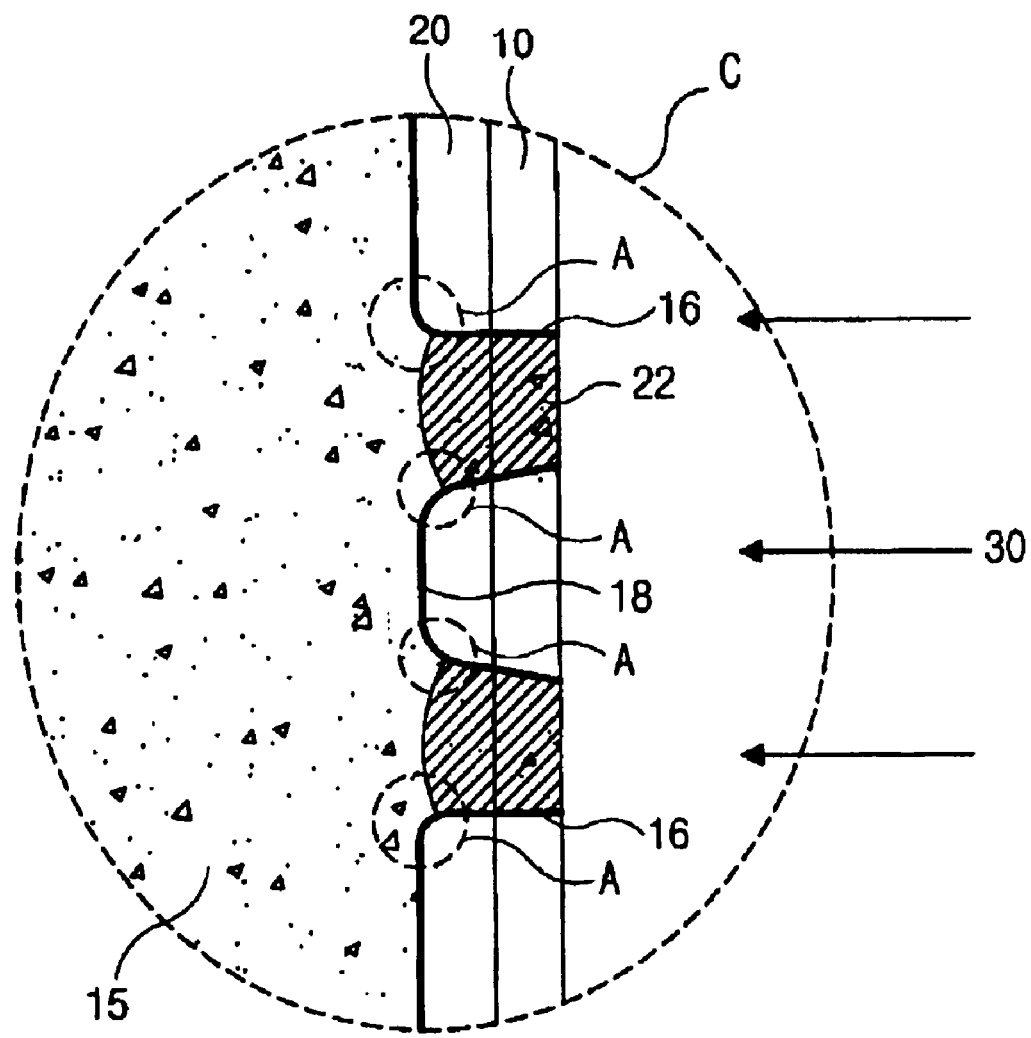
FIG. 2B is an expanded view of area "C" in FIG. 2A and illustrates a hardening process of sealing material according to the related art.
Figure 3A:
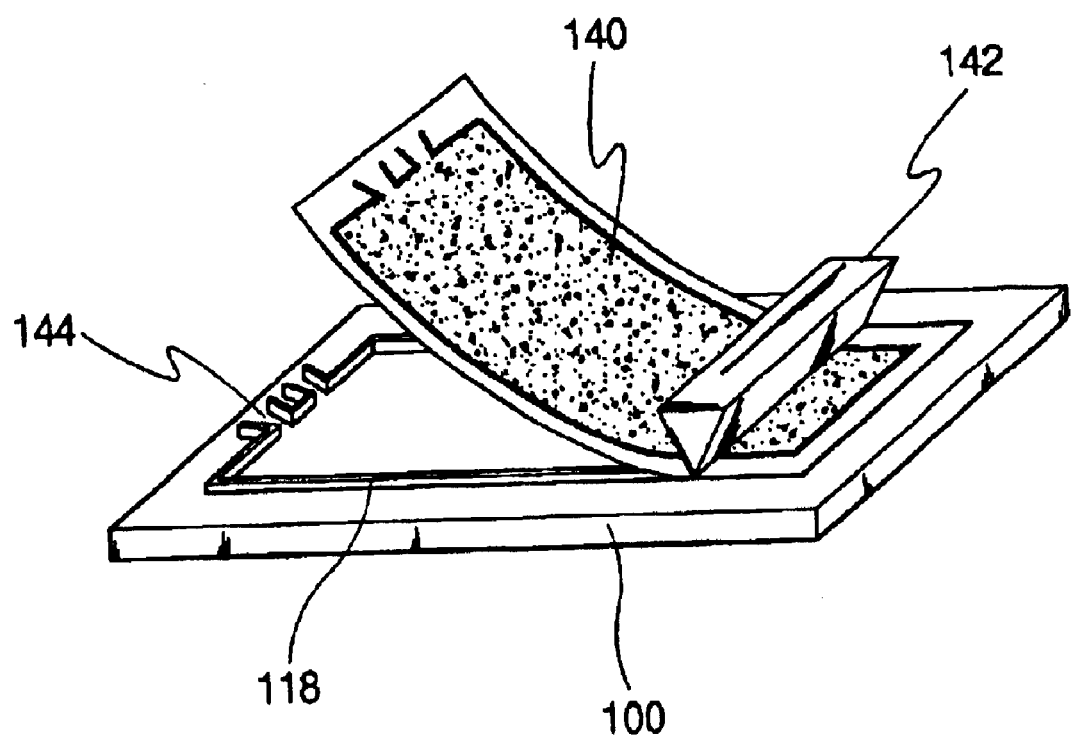
FIG. 3A is an exemplary seal pattern forming process using a screen printing method according to the present invention.
Figure 3B:
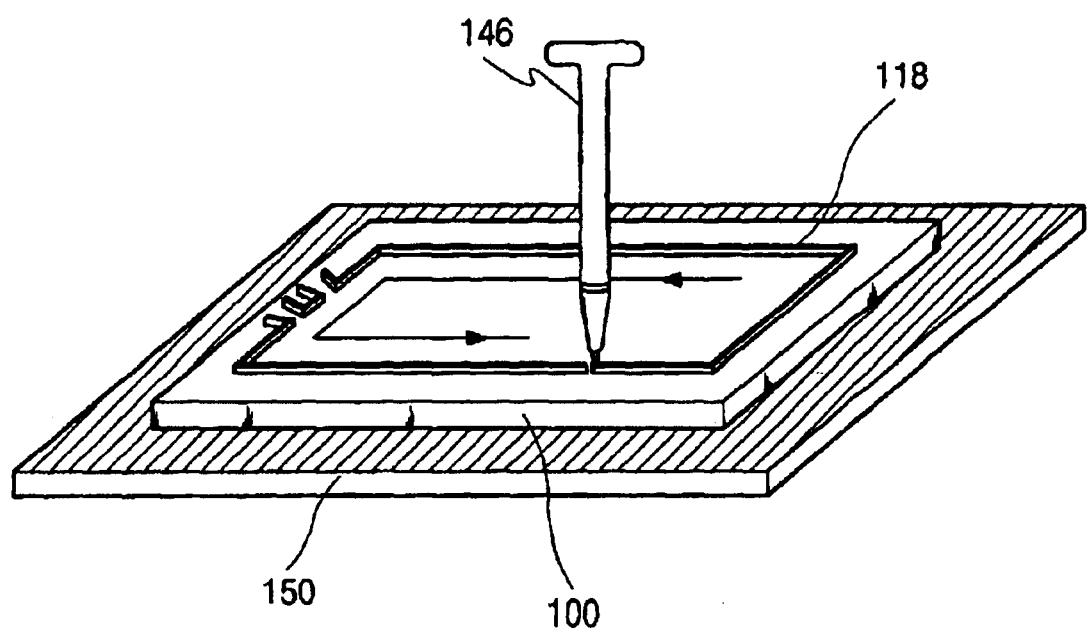
FIG. 3B is another exemplary seal pattern forming process using a dispensing method according to the present invention.

FIG. 3A is an exemplary seal pattern forming process using a screen printing method according to the present invention, and FIG. 3B is another exemplary seal pattern forming process using a dispensing method according to the present invention. In FIG. 3A, a screen 140, which may include a pattern having a specific shape formed thereupon, and a squeegee 142, which may be used for scrubbing sealant material onto the screen 140, may be prepared to form a seal pattern. A seal pattern 118 may be formed on a substrate 100 by scrubbing the sealant material onto the screen 140 using the squeegee 142, for example. Accordingly, the seal pattern may include formation of a cell gap for subsequent injection of liquid crystal material to prevent the injected liquid crystal material from leaking out of a liquid crystal cell. The seal pattern 118 may be formed along edges of the substrate 100 and may include at least one injection hole 144 formed at one side thereof.

An exemplary seal pattern forming process may include at least two processes. A first exemplary process may include formation of the seal pattern 118 on the substrate 100 by scrubbing the sealing material onto the screen 140, and a second exemplary process may include evaporating solvents contained in the sealing material to dry the sealing material. During the seal pattern forming process, it is necessary to form the seal pattern 118 having a uniform thickness and height. If the seal pattern 118 is not uniformly formed on the substrate 100, the cell gap that is formed after the seal pattern hardens becomes irregular. Thermosetting epoxy resins or ultraviolet (UV) hardening epoxy resins may be selected for the sealant material for the seal pattern 118. Although epoxy resins are innocuous to liquid crystal material, amines contained in thermosetting materials may decompose the liquid crystal material. Accordingly, if a thermosetting epoxy resin is used for the seal pattern 118, an adequate pre-baking must be performed by gradually changing a curing temperature after the seal pattern 118 is printed onto the substrate 100.

In FIG. 3B, an apparatus for the dispensing method may include a dispenser 146, a table 150, and a first substrate 100 placed on the table 150, wherein the dispensing method may include a syringe for dispensing the sealing material. For example, the seal pattern 118 may be formed by filling the sealing material into the dispenser 146, and then dispensing the sealing material onto the first substrate 100 by applying pressure to the syringe. Accordingly, the sealing material may be dispensed having a uniform width and thickness.

Once the seal pattern 118 has been formed on the first substrate 100 by at least one of the screen printing method and/or the dispensing method, spacers (not shown) may be formed on the first substrate 100 to maintain an uniform cell gap between the first substrate 100 and a second substrate (not shown). Subsequently, the first and second substrates may be attached to form a display panel, and the display panel may be cut into a unit cell.

Next, liquid crystal material may be injected into the display panel using a vacuum injection method, wherein the liquid crystal material is injected using a capillary action of the liquid crystal material. After the liquid crystal material has been injected into the display panel, the injection hole of the seal pattern 118 may be sealed with sealing material. For example, photo hardening resins or thermosetting resins may be used for the sealing material. Next, the sealing material may be hardened by irradiating ultraviolet light onto the sealing material.

Figure 4A:
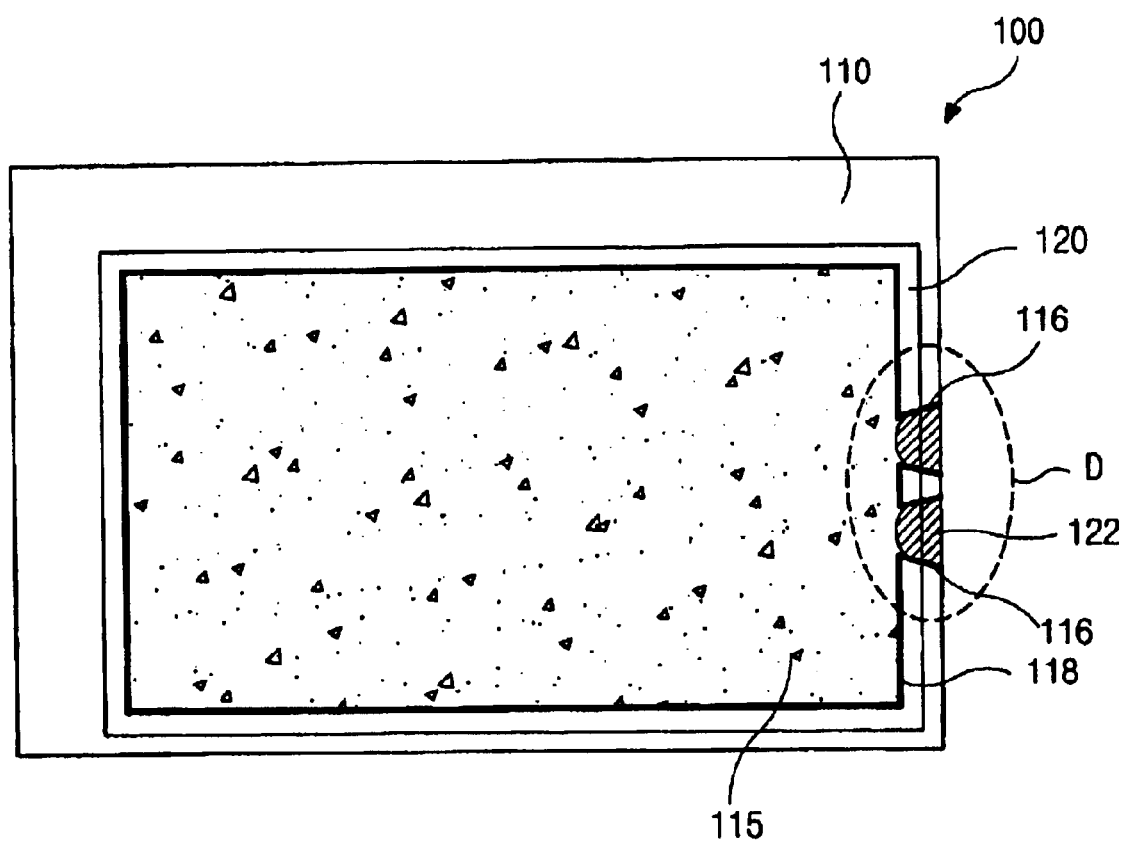
FIG. 4A is a plan view of another exemplary seal pattern structure according to the present invention.
Figure 4B:
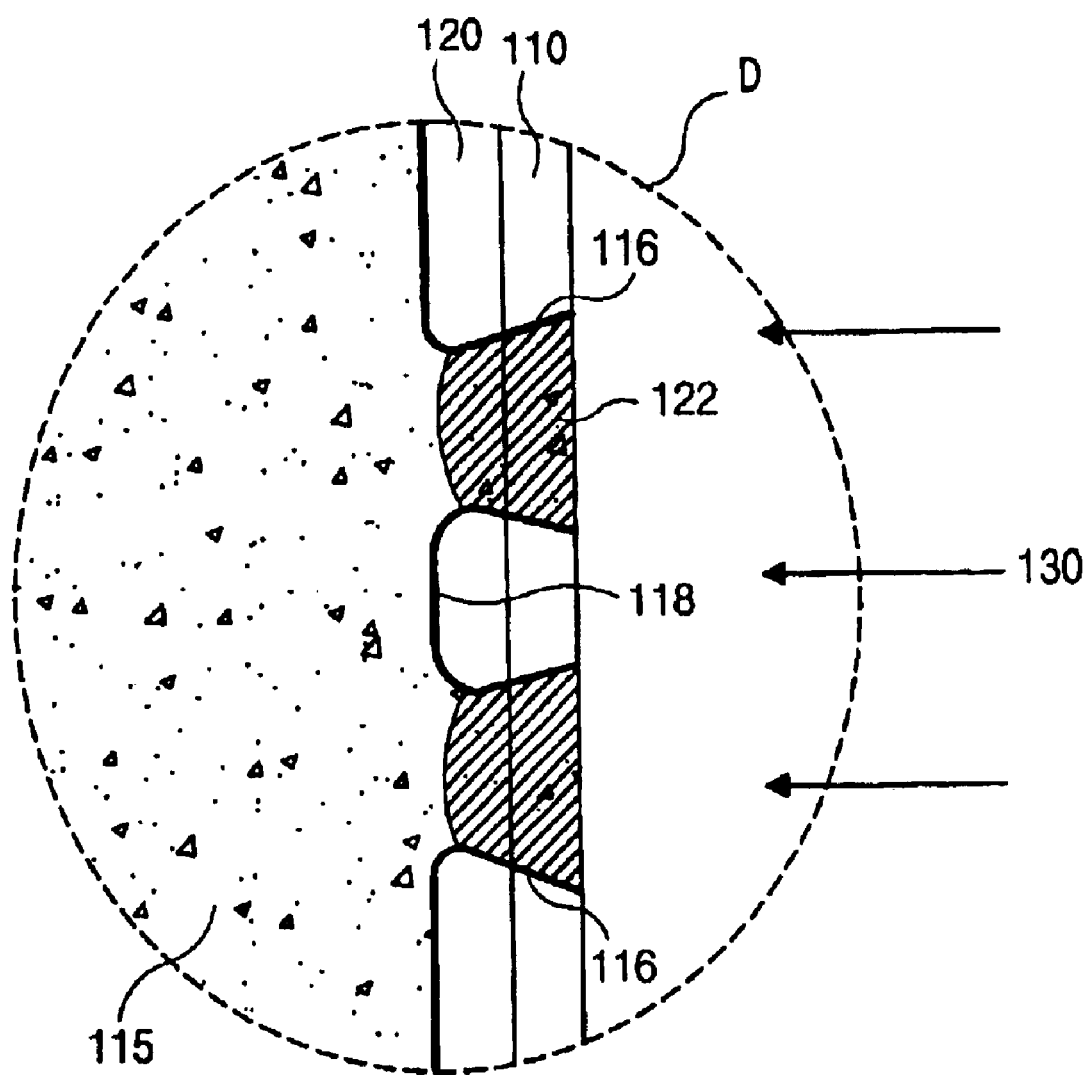
FIG. 4B is an expanded view of area "D" in FIG. 4A and illustrates a hardening process of sealing material according to the related art.

FIG. 4A is a plan view of another exemplary seal pattern structure according to the present invention, and FIG. 4B is an expanded view of area "D" in FIG. 4A and illustrates a hardening process of sealing material according to the related art. In FIG. 4A, a seal pattern 118 may be formed by at least one of the aforementioned methods on one of upper and lower substrates 120 and 110. For example, a liquid crystal cell 100 may include the upper substrate 120, the lower substrate 110, the seal pattern 118 and liquid crystal material 115 between the upper and lower substrates 120 and 110. Once the upper and lower substrates 120 and 110 are attached together by the seal pattern 118, and the liquid crystal material 115 may be injected into the liquid crystal cell 100 through a tapered injection hole 116, the sealing material 122 may be filled into the injection hole 116 to protect the injected liquid crystal material from leaking out. Although the seal pattern 118 is shown to have two injection holes 116, any number of injection holes may be formed in the seal pattern 118 depending on a size of the liquid crystal cell to be manufactured. Alternatively, one injection hole may be formed in the seal pattern 118. In addition, the tapered injection hole 116 may be formed to have spaced sidewalls so as to form a trapezoid. For example, a first width of the spaced sidewalls may be larger at an exterior side of the liquid crystal cell 100 as compared to a second width of the spaced sidewalls at an interior of the liquid crystal cell 100. Although not shown, the spaced sidewalls may also include various shapes and configurations to facilitate injection of the liquid crystal material 115.

In FIG. 4B, ultraviolet light 130 may be irradiated onto the injection hole 116 to harden the sealing material 122. Because the injection hole 116 may have a trapezoid shape in which a width of the injection hole becomes gradually smaller as it comes into the interior of the liquid crystal cell 100 (in FIG. 4A), interior portions of the sealing material 122 may be adequately exposed to the ultraviolet light. Accordingly, the sealing material adjacent to the injection hole 116 may be hardened.

An exemplary method for manufacturing the liquid crystal cell having the seal pattern according to the present invention will be described hereinafter. During a first process, an array substrate (lower substrate) having a thin film transistor and a pixel electrode, and a color filter substrate (upper substrate) having a color filter and a common electrode may be formed. During subsequent processes, an alignment layer may be formed on the upper and lower substrates.

Figure 5:
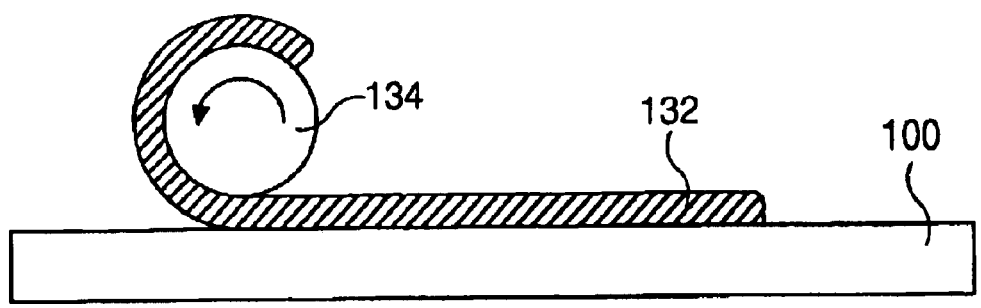
FIG. 5 is an exemplary process for forming an alignment layer according to the present invention.

FIG. 5 is an exemplary process for forming an alignment layer according to the present invention. In FIG. 5, the alignment layer 132 may formed on the substrate 100 by a roller 134, for example. The alignment layer 132 may function to uniformly align liquid crystal molecules of liquid crystal material. The alignment layer 132 may be formed of an organic polymer thin film using a spin-coating method or a print-coating method, for example. For example, a polyimide-based resin may be used to form the alignment layer 132 due to its relatively low temperature processing requirements. In addition, polyimide-based resins may be used because of their improved bonding properties, reduced residual effects, low light leakage, and decreased formation of pinholes. After the alignment layer 132 has been coated on the substrate 100, the coated alignment layer 132 may be hardened.

Figure 6:
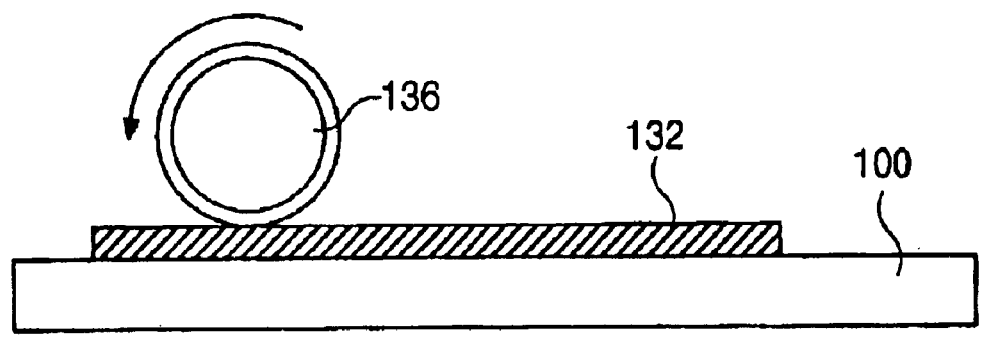
FIG. 6 is an exemplary process for rubbing the alignment layer of FIG. 5 according to the present invention.

FIG. 6 is an exemplary process for rubbing the alignment layer of FIG. 5 according to the present invention. In FIG. 6, a rubbing process may be performed on the coated alignment layer 132 on the substrate 100 using a rubbing fabric 136, for example. The rubbing process serves to abrade or scratch a surface of the alignment layer 132 to align liquid crystal molecules of liquid crystal material. For example, the surface of the alignment layer 132 may be rubbed along a first direction using the rubbing fabric 136, thereby a long axis of the liquid crystal molecules may be aligned to the first rubbed direction of the alignment layer 132.

Figure 7:
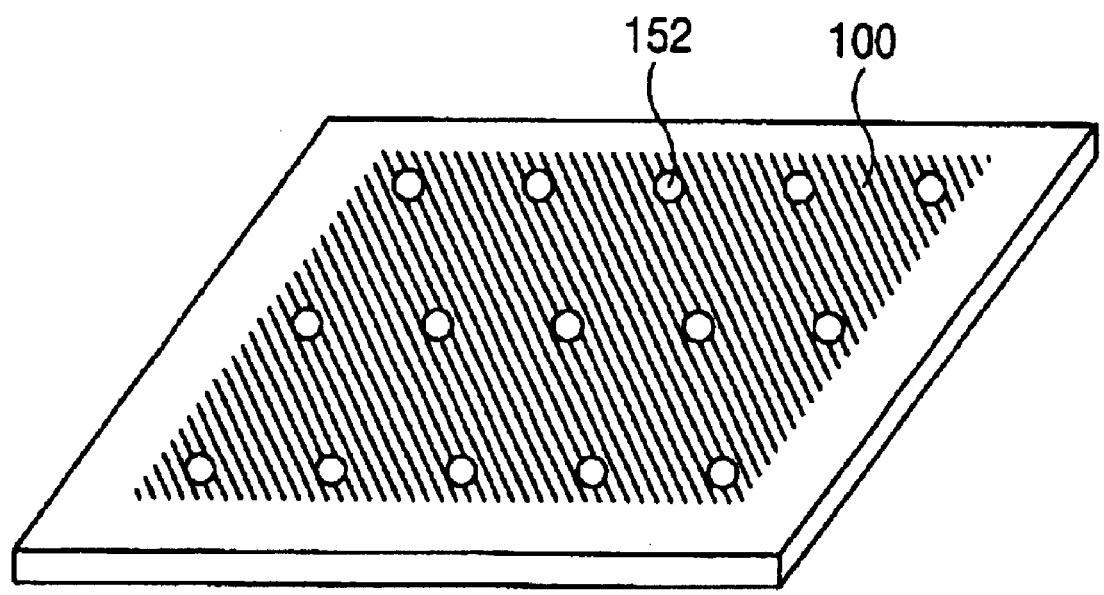
FIG. 7 is an exemplary spacer forming process according to the present invention.

FIG. 7 is an exemplary spacer forming process according to the present invention. In FIG. 7, spacers 152 may be dispensed onto a substrate 100 by mixing the spacers 152 in a solvent solution, and spraying the mixture onto the substrate 100 under a high pressure. Then, the solvent may be volatilized by heating, and a density of the spacers 152 may be controlled to be between about 100 and 200 piece/cm$^2$. The spacers 152 may be formed of a spherical shape having a diameter of about 4~5 $\mu$m, for example. Alternatively, the spacers 152 may be formed of different geometrical shapes, and may individually have different shapes.

During subsequent processes, the upper and lower substrates may be aligned and attached to each other. The degree to which the upper and lower substrates may be aligned may be determined by measuring an alignment margin. For example, the alignment margin may be less than a few microns when the substrates are initially designed. If the upper and lower substrates are aligned and attached within an alignment margin larger than a predetermined error margin, the display quality of the liquid crystal display device may be deteriorated due to light leakage during operation of the liquid crystal cell. After the seal pattern is formed on one of the upper and lower substrates, the substrates may undergo a pre-heating process to temporarily attach them together. Then, the substrates may be permanently attached together using a hardening process, such as a thermo-compression bonding process.

During subsequent processes, the attached substrates may be cut into unit cells. For example, a single glass substrate may include a plurality of smaller arrays or color filter substrates in cell areas that need to be separated.

Next, the liquid crystal material may be injected into the separated cells. Since each cell has a cell gap of only a few micrometers per hundredths of square centimeters in substrate area, a vacuum injection method may be used to inject the liquid crystal material into the cell gap. After the liquid crystal material has been injected into the cell, an injection hole through which the liquid crystal material was injected may be sealed with the sealing material. Next, ultraviolet light may used to harden the sealing material. As previously described, since the seal pattern has an injection hole shaped like a trapezoid whose width becomes gradually narrower from an entrance to an exit of the injection hole, the sealing material in the injection hole may be adequately and uniformly hardened by irradiating the ultraviolet light.

It will be apparent to those skilled in the art that various modifications and variation can be made in the seal pattern for liquid crystal display device and method for manufacturing liquid crystal display device having the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate having a plurality of thin film transistors and first electrodes connected to the thin film transistor;
   a second substrate having a plurality of color filters and second electrodes; and
   a seal pattern formed along edges of the first and second substrates, the seal pattern forming at least one injection hole having a trapezoid shape that extends past the edges of one of the first and second substrates,
   wherein a width of the injection hole decreases from a side exterior to the first and second substrates to a side interior to the first and second substrates.

2. The device according to claim 1, wherein the seal pattern is formed using a screen printing method.

3. The device according to claim 1, wherein the seal pattern is formed using a dispensing method.

4. The device according to claim 1, wherein the at lease one injection hole includes a plurality of injection holes.

5. The device according to claim 1, wherein the seal pattern is formed on the first substrate.

6. The device according to claim 1, wherein the seal pattern is formed on the second substrate.

7. The device according to claim 1, wherein the seal pattern includes a thermosetting resin.

8. The device according to claim 1, wherein the seal pattern includes a photo-hardening resin.

9. A method for manufacturing a liquid crystal display device, comprising:
   forming an alignment layer on first and second substrates;
   forming a seal pattern along edges of the first and second substrates, the seal pattern forming a plurality of injection holes having a trapezoid shape that extend east the edges of one of the first and second substrates, wherein a width of each of the injection holes decreases from a side adjacent to the edges of the first and second substrates to a side interior to the edges of the first and second substrates;
   forming a plurality of spacers on one of the first and second substrates;
   attaching the first and second substrates together;
   cutting the attached first and second substrates into a unit cell;
   injecting liquid crystal material into the unit cell via the injection holes;
   sealing the injection holes of the seal pattern; and
   hardening the seal pattern.

10. The method according to claim 9, wherein the seal pattern is formed using a screen printing method.

11. The method according to claim 9, wherein the seal pattern is formed using a dispensing method.

12. The method according to claim 9, wherein the seal pattern is formed on the first substrate.

13. The method according to claim 9, wherein the seal pattern is formed on the second substrate.

14. The method according to claim 9, wherein the seal pattern is hardened by irradiating ultraviolet light onto the sealing material.

15. The method according to claim 9, wherein the seal pattern includes a thermosetting resin.

16. The method according to claim 9, wherein the seal pattern includes a photo-hardening resin.

* * * * *